United States Patent
Herr et al.

(10) Patent No.: US 9,292,642 B2
(45) Date of Patent: Mar. 22, 2016

(54) SUPERCONDUCTING CIRCUIT PHYSICAL LAYOUT SYSTEM AND METHOD

(71) Applicants: Anna Y. Herr, Ellicott City, MD (US); Quentin P. Herr, Ellicott City, MD (US)

(72) Inventors: Anna Y. Herr, Ellicott City, MD (US); Quentin P. Herr, Ellicott City, MD (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 0 days.

(21) Appl. No.: 14/449,524

(22) Filed: Aug. 1, 2014

(65) Prior Publication Data

US 2016/0034609 A1 Feb. 4, 2016

(51) Int. Cl.
*G06F 17/50* (2006.01)

(52) U.S. Cl.
CPC .......... *G06F 17/505* (2013.01); *G06F 17/5072* (2013.01); *G06F 17/5077* (2013.01); *G06F 2217/02* (2013.01); *G06F 2217/08* (2013.01)

(58) Field of Classification Search
CPC ............ G06F 17/5072; G06F 17/5077; G06F 17/505; G06F 17/5009; G06F 17/5031; G06F 17/5036; G06F 17/5045; G06F 2217/80; G06F 12/0817; G06F 2209/5017; G06F 9/5033; H03K 19/17736; H03K 19/1736
USPC .................................. 716/100–108, 118–126
See application file for complete search history.

(56) References Cited

U.S. PATENT DOCUMENTS

2008/0028352 A1* 1/2008 Birch et al. ...................... 716/12
2013/0205274 A1* 8/2013 Bosshart ....................... 716/139

* cited by examiner

*Primary Examiner* — Binh Tat
(74) *Attorney, Agent, or Firm* — Tarolli, Sundheim, Covell & Tummino LLP (57) ABSTRACT

Systems and methods are provided for physical layout of superconductor circuits. The physical layout system and method is configured to place and route the superconducting circuits by first placing the gates in the form of gate tiles within unoccupied areas of a predetermined circuit design based on a netlist. Each gate tile type includes a particular gate type and a plurality of unassigned Josephson junctions that can be employed in the gates and/or the active interconnects. Inductive wires are then routed between gates incorporating and assigning the Josephson junctions to produce active interconnects between the I/O terminals of the gates based on connections defined in the netlist.

20 Claims, 4 Drawing Sheets

SUPERCONDUCTING CIRCUIT PHYSICAL LAYOUT SYSTEM AND METHOD

TECHNICAL FIELD

The present invention relates generally to superconducting circuits, and more particularly to a superconducting circuit physical layout system and method.

BACKGROUND

In the field of digital logic, extensive use is made of well known and highly developed CMOS (complimentary metal-oxide semiconductor) technology. As CMOS has begun to approach maturity as a technology, there is an interest in alternatives that may lead to higher performance in terms of speed, power dissipation computational density, interconnect bandwidth, and the like. An alternative to CMOS technology comprises superconductor based single flux quantum circuitry, utilizing superconducting Josephson junctions, with typical signal power of around 4 nW (nanowatts), at a typical data rate of 20 Gb/s (gigabytes/second), or greater, and operating temperatures of around 4° Kelvin.

Superconductor integrated circuit (IC) layout has typically treated active interconnects similar to the logic gates, with both interconnect and gates containing inductive wires that could be drawn differently in every instance to make connections. This does not map well onto a conventional place-and-route design flow in which gates and active interconnects are quite different with gates being placed first and active interconnects routed between gates. Another IC layout technique assures that gates and active interconnect cells both conform to a standard size, and all connections are made through adjacent cells. However, the overhead in terms of device count, density, and lost performance is very high.

SUMMARY

In accordance with one example, a computer-implemented method is provided for generating a physical layout output file for fabricating a superconducting circuit. The method comprises receiving a netlist file defining terminal input/output (I/O) connections between superconducting components, determining a respective gate tile type for each gate in the netlist, wherein the gate tile type includes a gate type associated with each gate type in the netlist and a plurality of associated unassigned Josephson junctions, and determining position placement of each gate tile and its associated Josephson junctions in a circuit layout. The method further comprising assigning unassigned Josephson junctions to Josephson junctions defined in active interconnect circuits of the netlist that provide terminal I/O connections between superconducting components, determining wire routes to couple the assigned Josephson junctions to one another and provide the wired inductors to form the active interconnect circuits that couple the terminal I/O connections between the superconducting components, and generating a physical layout output file with the determined position placement of each gate tile, and the determined wire routes.

In accordance with another example, a non-transitory computer readable medium is provided that is configured to store instructions that, when executed, are configured to perform a method for generating a physical layout output file for building a superconducting circuit. The method comprises receiving a netlist file defining terminal input/output (I/O) connections between superconducting components, wherein the superconducting components comprise gates, Josephson junctions, inductors and transformers, loading a gate tile library having a plurality of gate tile types with each gate tile type having a different associated gate type and a plurality of associated unassigned Josephson junctions, and selecting a gate tile for each gate in the netlist based on its corresponding gate tile type. The method further comprises determining position placement of each gate tile and its associated Josephson junctions in a circuit layout, determining wire routes for Josephson junctions assigned to gates based on the netlist, and assigning unassigned Josephson junctions to Josephson junctions defined in active interconnect circuits of the netlist that provide terminal I/O connections between superconducting components. The method also comprises determining wire routes to couple the assigned Josephson junctions to one another and provide the wired inductors to form the active interconnect circuits that couple the terminal I/O connections between the superconducting components, and generating a physical layout output file with the determined position placement of each gate tile, and the determined wire routes.

In accordance with a further example, a system is provided for generating a physical layout output file for fabricating a superconducting circuit. The system comprises a gate tile library having a plurality of gate tile types with each gate tile type having a different associated gate type and a plurality of associated unassigned Josephson junctions, a processor for executing machine readable instructions, and a memory. The memory includes a place and route algorithm that when executed by a processor is configured to load the gate tile library, receive a netlist file defining terminal input/output (I/O) connections between superconducting components of a superconducting circuit design, wherein the superconducting components comprise gates, Josephson junctions, inductors and transformers, and determine a respective gate tile type for each gate in the netlist. The executed place and route algorithm is further configured to determine position placement of each gate tile and its associated Josephson junctions in a circuit layout, assign unassigned Josephson junctions to Josephson junctions defined in active interconnect circuits of the netlist that provide terminal I/O connections between superconducting components, determine wire routes to couple the assigned Josephson junctions to one another and provide the wired inductors to form the active interconnect circuits that couple the terminal I/O connections between the superconducting components, and generate a physical layout output file with the determined position placement of each gate tile, and the determined wire routes.

DETAILED DESCRIPTION

A system and method is disclosed for physical layout of superconductor integrated circuits (ICs). In one example, the superconductor ICs employ superconductor digital logic formed from Reciprocal Quantum Logic (RQL) gates and RQL active interconnect circuits that couple inputs/output (I/O) terminals of the RQL gates to one another. In certain examples, the physical layout system and method is configured to place and route the RQL circuits by first placing the gates in the form of gate tiles within unoccupied areas of a predetermined circuit layer and/or unoccupied volumes of multiple predetermined circuit layers based on gates listed in a netlist associated with a superconductor circuit design. Each gate tile type includes a particular gate type and a plurality of unassigned Josephson junctions that are generic and that can be employed in the gates and/or the active interconnects. Each of the gate tile types can be of similar size and shape or varying defined sizes and/or shapes, such that placement of the gate tiles can be determined and optimized according to the relationships established by the netlist.

Inductive wires are then routed between gates incorporating and assigning the Josephson junctions to produce active interconnects between the I/O terminals of the gates based on connections defined in the netlist. It is to be appreciated that the physical layout system and method can be employed to place and route other types of superconducting circuits in addition to RQL circuits. The system and method then generate a circuit build output file based on the placing and routing to be employed in fabrication of the circuit design.

In certain examples, some of the Josephson junctions are assigned to and wired to its associated gate. The circuit layout can cover one or multipler layers based on given design constraints, and also can specifically target advanced design nodes with sub-um traces and increased vertical integration. The physical layout system and method can be employed to route other circuit layers into the superconductor circuit such as power/clock layers with bias transformers, and high high-efficiency transformer layers associated with gate structures.

Figure 1:
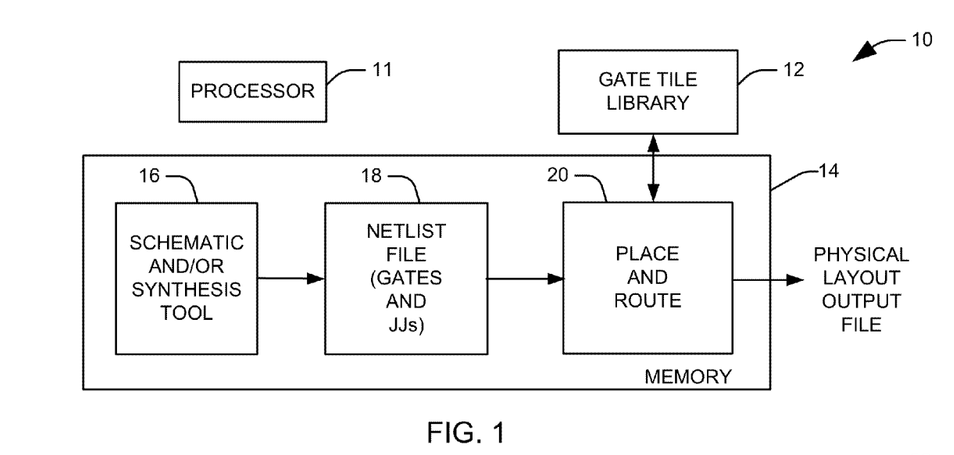
FIG. 1 illustrates a functional block diagram of an example of a superconductor circuit physical layout system.

FIG. 1 illustrates an example of a superconductor circuit physical layout system 10. The physical layout system 10 can be implemented for designing and building circuits, such as complementary metal-oxide semiconductor (CMOS) circuits, Reciprocal Quantum Logic (RQL) circuits, and/or other superconductor circuits. The circuit physical layout system 10 includes a processor 11, a gate tile library 12, and a memory 14. The memory 14 is a computer readable medium that includes computer executable instructions in the form of a schematic and/or synthesis tool editor 16 that can generate a netlist file 18 based on a superconducting circuit design, and a place and route tool or algorithm 20 that can employ the netlist file 18 to generate a physical layout output file. The physical layout output file defines the location of superconducting components and wire routes connecting those components within a single or multilayer circuit layout, which can be utilized in building an integrated circuit as defined.

The netlist file 18 defines terminal input/output (I/O) connections between superconducting components, wherein the superconducting components comprise gates, Josephson junctions, transformers and other superconducting components. The schematic and/or synthesis tool 16 and the place and route algorithm 20 can operate as independent programs or can be integrated into a single tool along with or without a hardware description language tool for simulating operations of circuit designs. The processor 11 and the memory 14 can form at least a portion of a computing system that can be part of a computer (e.g., desktop computer, laptop computer, handheld device, etc.). The gate tile library 22 can reside in the memory or reside in a separate memory on a different computing system. The physical layout system 10 can be configured, for example, as any of a variety of commercial CMOS physical layout systems that are configured to design CMOS, RQL circuits and/or other superconductor circuits (e.g., via the processor 11).

In the example of FIG. 1, a user can design a superconductor circuit utilizing the schematic and/or synthesis tool 16, which can generate the netlist file 18 that defines superconducting components and terminal input/output (I/O) connections between superconducting components. The superconducting components can comprise RQL gates and Josephson junctions that can be utilized in circuitry associated with the RQL gates and/or Josephson transmission line (JTL) active interconnects that couple the I/O terminals of the RQL gates to one another. The superconducting components can also include bias transformers for biasing the JTL active interconnects and high-efficiency transformers utilized in the gate devices. The superconducting components can also include a variety of other superconducting components based on an associated design, including interconnects on passive transmission lines.

Figure 2:
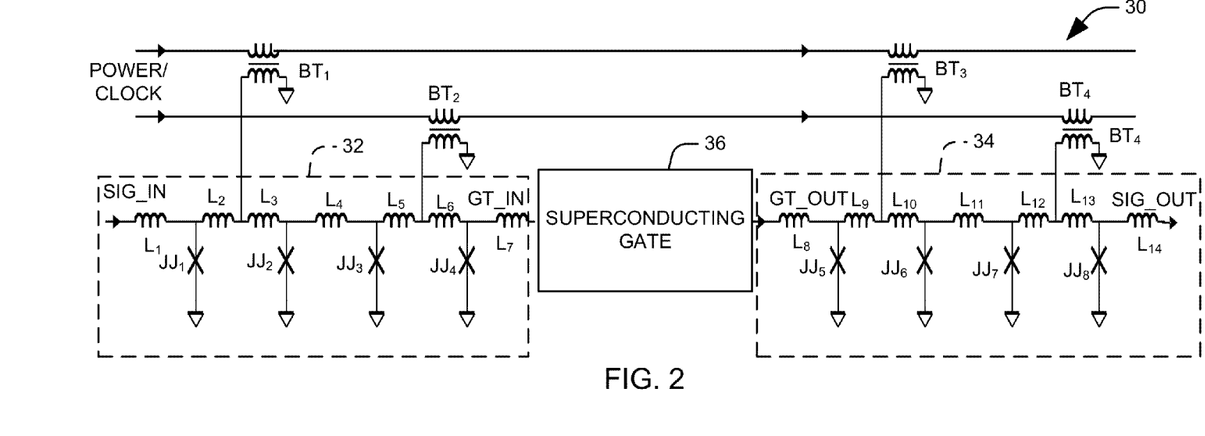
FIG. 2 illustrates an exemplary Reciprocal Quantum Logic (RQL) circuit.

FIG. 2 illustrates an exemplary RQL circuit 30 that can be routed within one or more layers of an integrated circuit employing the physical layout system 10. The RQL circuit 30 includes a JTL active interconnect input circuit 32 coupled to an input terminal (GT_IN) of a superconducting gate 36 and a JTL active interconnect output circuit 34 coupled to an output terminal (GT_OUT) of the superconducting gate 36. The active interconnect input circuit 32 receives an input signal (SIG_IN) on input indictor $L_1$, for example, from another gate. $L_1$ is connected to a first JTL formed of inductors $L_2$ and $L_3$ and Josephson junctions $JJ_1$ and $JJ_2$. The first JTL is connected to a second JTL formed of inductors $L_5$ and $L_6$ and Josephson junctions $JJ_3$ and $JJ_4$ through inductive wire $L_4$. The second JTL is connected to the input terminal (GT_IN) of the superconducting gate 36 through inductive wire $L_7$.

The active interconnect output circuit 34 receives an output signal (SIG_OUT) from an output terminal of the superconducting gate 36. The output signal is provided to a third JTL through wired inductor $L_8$. The third JTL is formed of inductors $L_9$ and $L_{10}$ and Josephson junctions $JJ_5$ and $JJ_6$. The third JTL is connected to a fourth JTL formed of inductors $L_{12}$ and $L_{13}$ and Josephson junctions $JJ_7$ and $JJ_8$ through inductive wire $L_{11}$. The fourth JTL is connected to the output of the active interconnect output circuit 34 through inductive wire $L_{14}$. Power and clock connections are provided through bias transformer $BT_1$ connected between $L_2$ and $L_3$ of the active interconnect input circuit 32, and bias transformer $BT_2$ connected between $L_5$ and $L_6$ of the active interconnect input circuit 32. Power and clock connections are also provided through bias transformer $BT_3$ connected between $L_9$ and $L_{10}$ of the active interconnect output circuit 34, and bias transformer $BT_4$ connected between $L_{12}$ and $L_{13}$ of the active interconnect output circuit 34. Gate high-efficiency transformers are not shown.

Referring again to FIG. 1, the processor 11 executes the place and route algorithm 20 which reads or receives the netlist file 18. The place and route algorithm 20 is configured to load or read a gate tile library 12 that defines a plurality of gate tile types. Each gate tile type includes a particular gate type and a plurality of Josephson junctions that are generic or unassigned. Each of the gate tile types can be of similar size and shape or varying library defined sizes and/or shapes, such that placement of the gate tiles within the area and/or volume constraints of a given integrated circuit design can be determined and placement optimized according to the netlist connections and gate tile sizes. The place and route algorithm 20 considers the gate tile sizes and circuit design connections when placing gate tiles in the circuit design area and/or volume.

Figure 3:
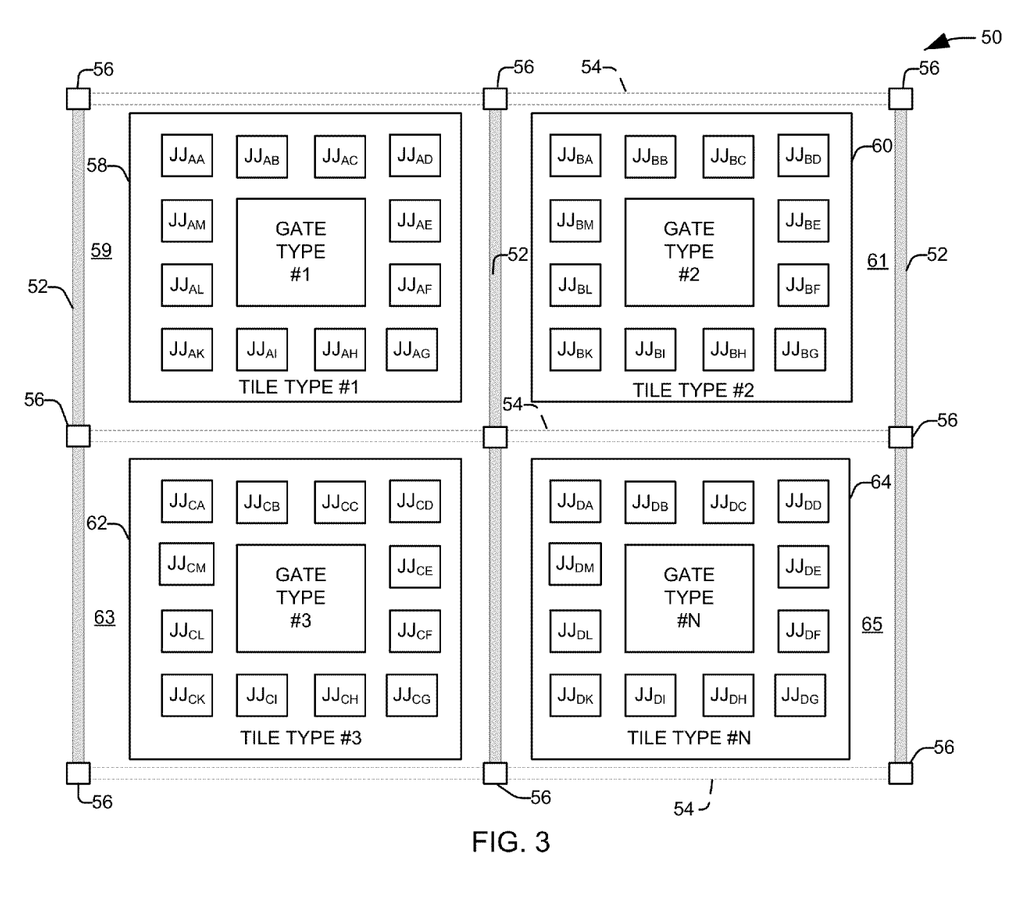
FIG. 3 illustrates a top view of virtual placement of a plurality of gate tiles.

The place and route algorithm 20 determines a respective gate tile type for each gate in the netlist 18, and determines position placement of each gate tile and its associated Josephson junctions in a circuit layout based at least in part on the connections between superconducting components in the netlist 18, and the gate tile type size and/or shape for each given gate in the netlist 18. For example, FIG. 3 illustrates a top view of virtual placement of a plurality of gate tiles, labeled gate tile type #1 through gate tile type #N, across a virtual circuit area and/or volume 50, wherein N is an integer greater than one. In the example of FIG. 3, solid lines represent devices and features on a top layer and dashed lines represent devices and features on a layer underneath the top layer. In the present example, each tile is formed of a single gate of a given type and a plurality of unassigned Josephson junctions that are placed and spaced around the outer perimeter of the gate. It is to be appreciated that this is but one possible Josephson junction arrangement and the Josephson junctions may be arranged in a variety of different configurations. Furthermore, the number of unassigned Josephson junctions may be selected based on a given design choice. Additionally, example tiles can include one or more of single gate tiles, multiple gate tiles and/or no gate tiles based on a given design implementation.

In the example of FIG. 3, the size and shape of each gate tile is substantially similar such that each gate tile takes up about the same amount of space in the circuit area and volume 50. In the virtual example, each gate tile is placed on a first layer in a particular cell of a plurality of cells covering the chip area and/or volume. Each cell is defined by ground lines of a ground grid formed of top vertical ground lines 52 and underlying horizontal ground lines 54 connected to one another by ground vias 56. As shown, a first tile 58 is formed of a first tile type (Tile Type #1) having a first gate type (Gate Type #1) and is placed in a first cell 59, a second tile 60 formed of a second tile type (Tile Type #2) having a second gate type (Gate Type #2) is placed in a second cell 61, and a third tile 62 formed of a third tile type (Tile Type #3) having a third gate type (Gate Type #3) is placed in a third cell 63. A fourth tile 64 is formed of an Nth tile type having an Nth gate type is placed in a fourth cell 65. This placement of tiles can be repeated for X tiles of N varying tile types, where X and N are integers greater than 1, limited by the defined constraints of the circuit area and/or volume for placing and routing gates and active interconnects.

The first gate tile 58 includes a plurality of Josephson junctions labeled, $JJ_{AA}$-$JJ_{AK}$, the second gate tile 60 includes a plurality of Josephson junctions labeled, $JJ_{BA}$-$JJ_{BK}$, the third gate tile 62 includes a plurality of Josephson junctions labeled, $JJ_{CA}$-$JJ_{CK}$, and the fourth gate tile 64 includes a plurality of Josephson junctions labeled, $JJ_{DA}$-$JJ_{DK}$. Josephson junctions can be preassigned to gates based on the netlist 18 or be available to assign for utilization in forming JTL active interconnects for connecting gate I/O terminals between gates based on the netlist 18 and distance between connectable superconducting components.

The place and route algorithm 20 then determines wire routes between I/O terminals of connected gates based on the connections between superconducting components defined in the netlist 18. Some Josephson junctions are assigned to gates along with the connections between the gate assigned Josephson junctions, the I/O terminals of the gates and the connections to gate high-efficiency transformers (PT). Unassigned Josephson junctions are free for use in forming JTL active interconnects that connect I/O terminals of gates and other superconducting components to one another. The place and route algorithm 20 determines the unassigned Josephson junctions utilized in the active interconnects, for example, based on proximate location of the Josephson junction to the I/O terminals of the respective superconducting components to be coupled together. The wiring itself forms the inductors of the JTL active interconnects and other superconducting components.

Figure 4:
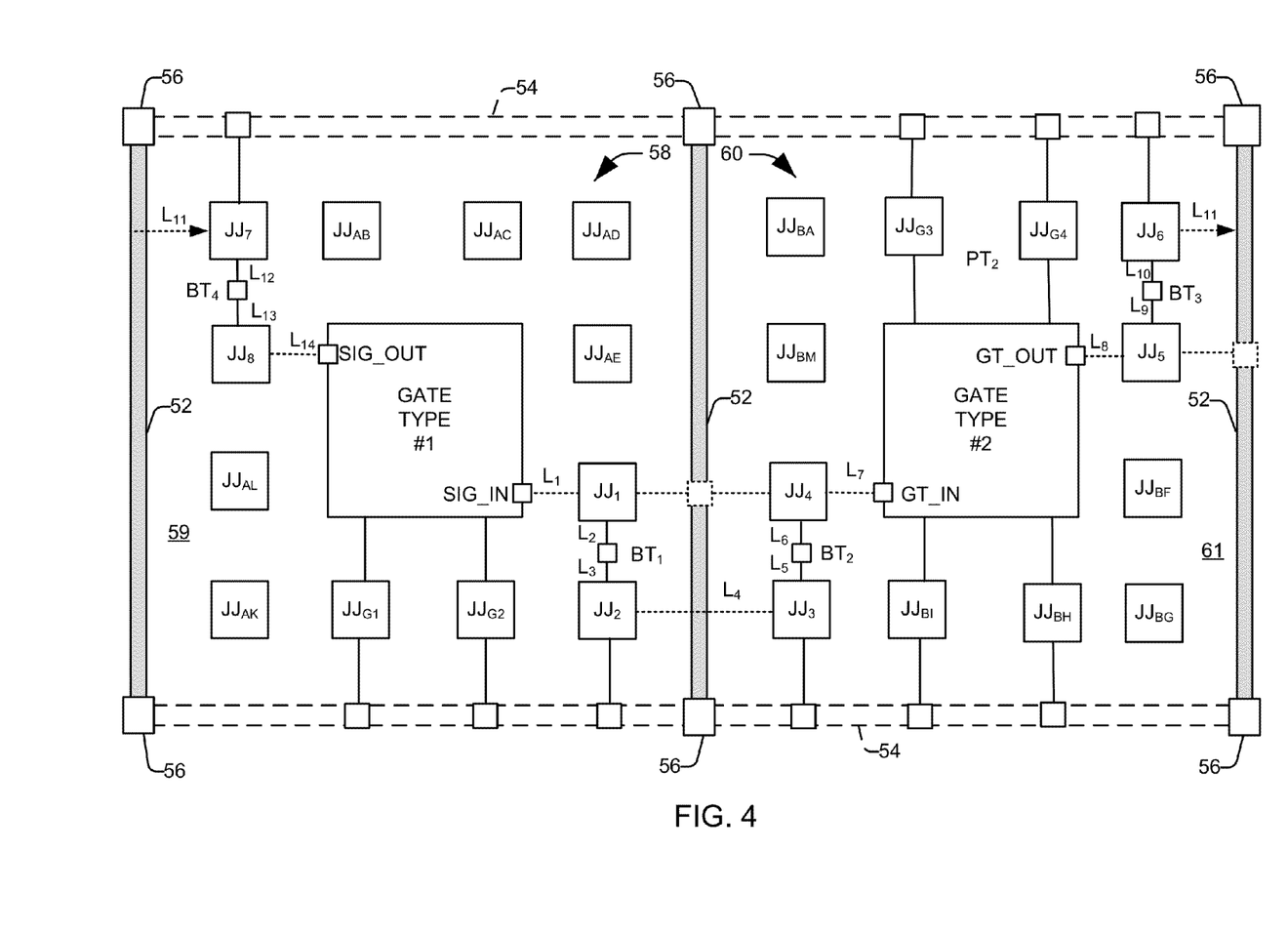
FIG. 4 illustrates a top view of virtual wiring of a plurality of gate tiles.

FIG. 4 illustrates an example of a possible wire routing of the circuit illustrated in FIG. 2 employing the first tile 58 and the second tile 60 that is illustrated in FIG. 3. As previously stated, all solid lines extend vertically along the first tile 58 and the second tile 60 and can reside on a first layer along with each of the Josephson junctions, while all dashed lines run horizontally along the first tile 58 and the second tile 60 and reside on an underlying layer below the first layer. Again, ground lines 52 running vertically on the first layer are coupled to ground lines 54 running horizontally on the underlying layer via ground vias 56.

As shown, a first gate Josephson junction ($JJ_{G1}$) and a second gate Josephson junction ($JJ_{G2}$) are assigned to the first gate type (Gate Type #1) in the first cell 59. First ends of the first gate Josephson junction ($JJ_{G1}$) and the second gate Josephson junction ($JJ_{G2}$) are routed to I/O terminals of the first gate type (Gate Type #1) in the first cell 59. Second ends of the first gate Josephson junction ($JJ_{G1}$) and the second gate Josephson junction ($JJ_{G2}$) are routed to the ground line 54 on the underlying layer below the first layer employing the ground vias 56. A third gate Josephson junction ($JJ_{G3}$) and a fourth gate Josephson junction ($JJ_{G4}$) are assigned to the second gate type (Gate Type #2) in the second cell 61. First ends of the third gate Josephson junction ($JJ_{G3}$) and the fourth gate Josephson junction ($JJ_{G4}$) are routed to I/O terminals of the second gate type (Gate Type #2) in the second cell 61. Second ends of the third gate Josephson junction ($JJ_{G3}$) and the fourth gate Josephson junction ($JJ_{G4}$) are routed to a ground line 54 on an underlying layer of the first layer employing the ground vias 56.

The place and route algorithm 20 then assigns unassigned Josephson junctions to JTL active interconnect devices defined in the netlist. For example, $JJ_{AF}$, $JJ_{AG}$, $JJ_{BJ}$, and $JJ_{BK}$ have been assigned to $JJ_1$, $JJ_2$, $JJ_3$ and $JJ_4$, respectively, to form the active interconnect input 32 illustrated in FIG. 2. Additionally, $JJ_{BE}$, $JJ_{BD}$, $JJ_{AA}$ and $JJ_{AM}$ have been assigned to $JJ_5$, $JJ_6$, $JJ_7$ and $JJ_8$, respectively to form the active interconnect output 34 illustrated in FIG. 2. The place and route algorithm 20 then virtually routes wires to form the active interconnect wired inductors $L_1$-$L_7$ of the active interconnect input 32, and the active interconnect wired inductors $L_8$-$L_{14}$ of the active interconnect output 34. The place and route algorithm 20 also can route selective active interconnect inductors to bias transformers of a clock/power circuit, as shown in FIG. 2.

For example, connection terminal of $L_2$ and $L_3$ is connected to a first bias terminal ($BT_1$) of a bias transformer in another layer above or below the first layer. Additionally, connection terminal of $L_5$ and $L_6$ is connected to a second bias terminal ($BT_2$) of a bias transformer in another layer above or below the first layer, connection terminal of $L_9$ and $L_{10}$ is connected to a third bias terminal ($BT_3$) of a bias transformer in another layer above or below the first layer, and connection terminal of $L_{12}$ and $L_{13}$ is connected to a fourth bias transformer terminal ($BT_4$) of a bias transformer in another layer above or below the first layer. The place and route algorithm 20 can then generate a physical layout output file with the determined position placement of the superconductor components and the determined wire routes for fabrication, for example, by an integrated circuit build shop.

Figure 5:
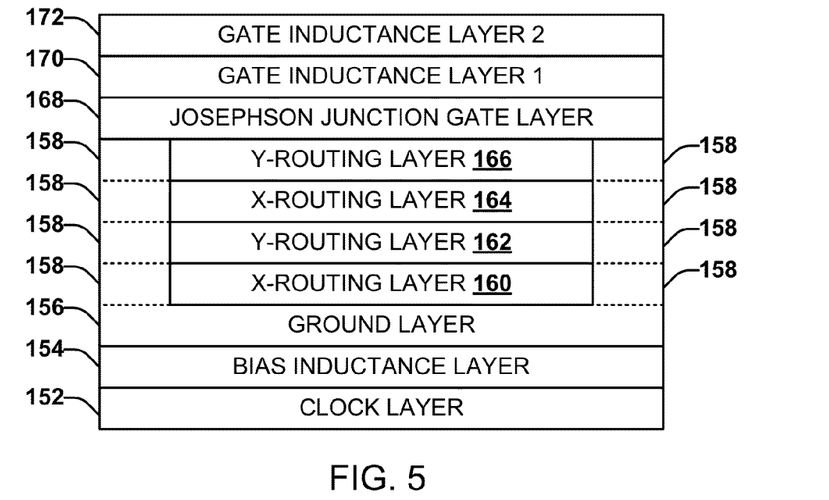
FIG. 5 illustrates an example bock diagram of a multilayer superconducting circuit.

The examples of FIGS. 3-4 illustrates routing wires, to form active interconnects for connecting gates, along a horizontal X direction and a vertical Y direction relative to a circuit area and/or volume of a first layer and another layer above or below the first layer of the superconducting circuit. This routing can be part of routing of a larger multilayer superconductor design. For example, FIG. 5 illustrates an example bock diagram of a multilayer superconducting circuit 150. In the example of FIG. 5, the superconducting circuit 150 is demonstrated as a block diagram of a ten layer stack. A first layer 152 is demonstrated as a clock layer, such as can be provided a clock signal (e.g., an AC signal or AC quadrature signal). A second layer 154 is demonstrated as a bias inductance layer to which the clock signal can be inductively coupled to provide a bias current potential for triggering Josephson junctions associated with the superconducting circuit 150. As an example, the clock layer 152 and the bias inductance layer 154 can have portions that are inductively coupled to provide the clock signal at at least one phase to provide sequential triggering of the respective Josephson junctions (e.g., in an RQL circuit implementation). Alternatively, the clock layer 152 and the bias inductance layer 154 can respectively receive and induce a DC bias signal, such as to provide bias for the Josephson junctions for input signals provided via other layers of the superconducting circuit 150.

The superconducting circuit 150 also includes a ground layer 156 that can be conductively coupled to a low-voltage rail (e.g., ground), and four conductor layers overlying the ground layer 156. The four conductor layers for forming active interconnects for connecting superconducting gates are demonstrated as a first X-routing layer 158, a first Y-routing layer 160, a second X-routing layer 162, and a second Y-routing layer 164 successively overlying each other. Each of the conductor layers 158, 160, 162, and 164 can include at least one conductor that extends along the respective one of the X-axis (e.g., the conductor layers 158 and 162) or the Y-axis (e.g., the conductor layers 160 and 164). For example, the conductor(s) in each of the conductor layers 158, 160, 162, and 164 can be implemented as JTL active interconnects and gates to route SFQ pulses to and from other superconducting circuits. In addition, in the example of FIG. 5, the superconducting circuit 150 includes a three-dimensional ground mesh 166 that is conductively coupled to the ground layer 156 and which extends in a direction that is orthogonal to the ground layer 156 (i.e., the Z-axis), such that portions of the three-dimensional ground mesh 166 are substantially coplanar with the conductor layers 158, 160, 162, and 164. Therefore, the inductance of the conductive coupling to the three-dimensional ground mesh 166 can be controlled in the superconducting circuit 150 in providing ground return paths for respective signals propagating in the conductor layers 158, 160, 162, and 164.

The superconducting circuit 150 also includes a Josephson junction gate layer 168 overlying the second Y-routing layer 164, a first gate inductance layer 170 overlying the Josephson junction gate layer 168, and a second gate inductance layer 172 overlying the first gate inductance layer 170. The Josephson junction gate layer 168 can include at least one Josephson junction that can be associated with operation of a superconducting gate, such as associated with a superconducting circuit tile that includes the superconducting circuit 150. Similarly, the first and second gate inductance layers 170 and 172 can correspond to inductive couplings of signals (e.g., SFQ pulses) that are provided to and/or from the superconducting circuit 150, such as based on the at least one Josephson junction of the Josephson junction gate layer 168. Accordingly, the superconducting circuit 150 can operate as an independent superconducting circuit or as part of a larger superconducting circuit.

Figure 6:
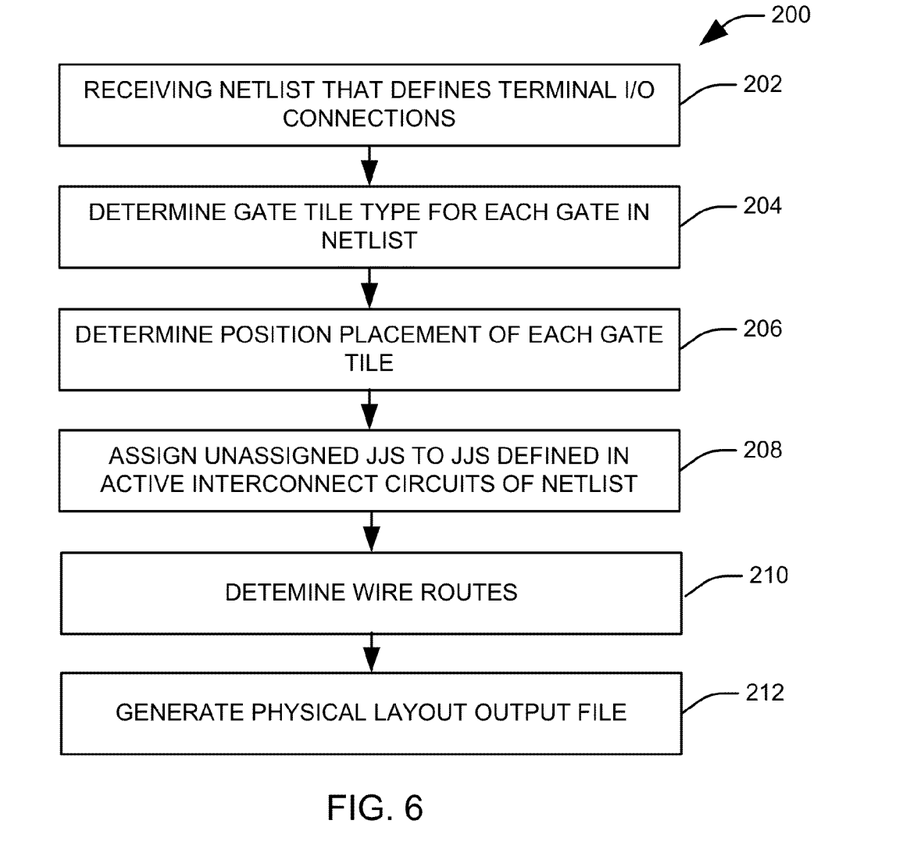
FIG. 6 illustrates a flow diagram of a method for generating a physical layout output file for fabricating a superconducting circuit.

In view of the foregoing structural and functional features described above, an example methodology will be better appreciated with reference to FIG. 6. While, for purposes of simplicity of explanation, the methodology of FIG. 6 is shown and described as executing serially, it is to be understood and appreciated that the present invention is not limited by the illustrated order, as some actions could in other examples occur in different orders and/or concurrently from that shown and described herein.

FIG. 6 illustrates a flow diagram of a method for generating a physical layout output file for fabricating a superconducting circuit. The method begins at 202 where a netlist file is received that defines terminal input/output (I/O) connections between superconducting components. At 204, a respective gate tile type is determined for each gate in the netlist. The gate tile type can include a gate type associated with each gate type in the netlist and a plurality of associated unassigned Josephson junctions. At 206, position placement is determined for each gate tile and it's associated Josephson junctions in a circuit layout. At 208, unassigned Josephson junctions are assigned to Josephson junctions defined in active interconnect circuits of the netlist that provide terminal I/O connections between superconducting components. At 210, wire routes are determined to couple the assigned Josephson junctions to one another and provide the wired inductors to form the active interconnect circuits that couple the terminal I/O connections between the superconducting components. At 212, a physical layout output file is generated with the determined position placement of each gate tile, and the determined wire routes.

In view of the foregoing structural and functional description, those skilled in the art will appreciate that portions of the systems and method disclosed herein may be embodied as a method, data processing system, or computer program product such as a non-transitory computer readable medium. Accordingly, these portions of the approach disclosed herein may take the form of an entirely hardware embodiment, an entirely software embodiment (e.g., in a non-transitory machine readable medium), or an embodiment combining software and hardware. Furthermore, portions of the systems and method disclosed herein may be a computer program product on a computer-usable storage medium having computer readable program code on the medium. Any suitable computer-readable medium may be utilized including, but not limited to, static and dynamic storage devices, hard disks, optical storage devices, and magnetic storage devices.

Certain embodiments have also been described herein with reference to block illustrations of methods, systems, and computer program products. It will be understood that blocks of the illustrations, and combinations of blocks in the illustrations, can be implemented by computer-executable instructions. These computer-executable instructions may be provided to one or more processors of a general purpose computer, special purpose computer, or other programmable data processing apparatus (or a combination of devices and circuits) to produce a machine, such that the instructions, which execute via the one or more processors, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

What have been described above are examples. It is, of course, not possible to describe every conceivable combination of structures, components, or methods, but one of ordinary skill in the art will recognize that many further combinations and permutations are possible. Accordingly, the invention is intended to embrace all such alterations, modifications, and variations that fall within the scope of this application, including the appended claims. Where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A computer-implemented method for generating a physical layout output file for fabricating a superconducting circuit, the method comprising:
   receiving a netlist file defining terminal input/output (I/O) connections between superconducting components;
   determining a respective gate tile type for each gate in the netlist, wherein the gate tile type includes a gate type associated with each gate type in the netlist and a plurality of associated unassigned Josephson junctions;
   determining position placement of each gate tile and its associated Josephson junctions in a circuit layout;
   assigning unassigned Josephson junctions to Josephson junctions defined in active interconnect circuits of the netlist that provide terminal I/O connections between superconducting components;
   determining wire routes to couple the assigned Josephson junctions to one another and provide the wired inductors to form the active interconnect circuits that couple the terminal I/O connections between the superconducting components; and
   generating a physical layout output file with the determined position placement of each gate tile, and the determined wire routes.

2. The method of claim 1, further comprising determining wire routes for Josephson junctions assigned to gates based on the netlist.

3. The method of claim 1, wherein the superconducting components comprise gates, Josephson junctions, inductors and transformers.

4. The method of claim 1, wherein the netlist file is generated by a schematic and/or synthesis tool based on a superconductor circuit design.

5. The method of claim 1, wherein the determining a respective gate tile for each gate name in the netlist comprises loading a gate tile library having a plurality of gate tile types with each gate tile type having a different associated gate type, and selecting a gate tile type based on a given gate type in the netlist for each gate in the netlist.

6. The method of claim 1, wherein each gate tile type is at least one of substantially a same size and substantially a same shape.

7. The method of claim 1, wherein the determining position placement of each gate tile and its associated Josephson junctions in a circuit layout is based at least in part on at least one of the connections between superconducting components in the netlist, the size of each gate tile and the shape of each gate tile.

8. The method of claim 1, wherein the determined position placement of each tile and the determined wire routes covers multiple layers of a multilayer circuit layout.

9. The method of claim 1, wherein the determined wire routes include wire routes to bias transformers for biasing the active interconnects and/or to high-efficiency transformers that are part of the gate structures.

10. A non-transitory computer readable medium configured to store instructions that, when executed, are configured to perform a method for generating a physical layout output file for building a superconducting circuit, the method comprising:
    receiving a netlist file defining terminal input/output (I/O) connections between superconducting components, wherein the superconducting components comprise gates, Josephson junctions, inductors and transformers;
    loading a gate tile library having a plurality of gate tile types with each gate tile type having a different associated gate type and a plurality of associated unassigned Josephson junctions;
    selecting a gate tile for each gate in the netlist based on its corresponding gate tile type;
    determining position placement of each gate tile and its associated Josephson junctions in a circuit layout;
    determining wire routes for Josephson junctions assigned to gates based on the netlist;
    assigning unassigned Josephson junctions to Josephson junctions defined in active interconnect circuits of the netlist that provide terminal I/O connections between superconducting components;
    determining wire routes to couple the assigned Josephson junctions to one another and provide the wired inductors to form the active interconnect circuits that couple the terminal I/O connections between the superconducting components; and
    generating a physical layout output file with the determined position placement of each gate tile, and the determined wire routes.

11. The medium of claim 10, wherein the netlist file is generated by a schematic and/or synthesis tool based on a superconductor circuit design.

12. The medium of claim 10, wherein each gate tile type is at least one of substantially a same size and substantially a same shape.

13. The medium of claim 10, wherein the determining position placement of each gate tile and its associated Josephson junctions in a circuit layout is based at least in part on at least one of the connections between superconducting components in the netlist, the size of each gate tile and the shape of each gate tile.

14. The medium of claim 10, wherein the determined position placement of each tile and the determined wire routes covers multiple layers of a multilayer circuit layout.

15. The medium of claim 10, wherein the determined wire routes include wire routes to bias transformers for biasing the active interconnects and/or to high-efficiency transformers that are part of the gate structures.

16. A superconductor circuit physical layout system comprising:

a gate tile library having a plurality of gate tile types with each gate tile type having a different associated gate type and a plurality of associated unassigned Josephson junctions;

a processor for executing machine readable instructions;

a memory having a place and route algorithm that when executed by a processor is configured to:

load the gate tile library;

receive a netlist file defining terminal input/output (I/O) connections between superconducting components of a superconducting circuit design, wherein the superconducting components comprise gates, Josephson junctions, inductors and transformers;

determine a respective gate tile type for each gate in the netlist;

determine position placement of each gate tile and its associated Josephson junctions in a circuit layout;

assign unassigned Josephson junctions to Josephson junctions defined in active interconnect circuits of the netlist that provide terminal I/O connections between superconducting components;

determine wire routes to couple the assigned Josephson junctions to one another and provide the wired inductors to form the active interconnect circuits that couple the terminal I/O connections between the superconducting components; and generate a physical layout output file with the determined position placement of each gate tile, and the determined wire routes.

17. The system of claim 16, wherein the place and route algorithm is further configured to determine wire routes for Josephson junctions assigned to gates based on the netlist.

18. The system of claim 16, wherein each gate tile type is at least one of substantially a same size and substantially a same shape.

19. The system of claim 16, wherein the position placement of each gate tile and its associated Josephson junctions in a circuit layout is based at least in part on at least one of the connections between superconducting components in the netlist, the size of each gate tile and the shape of each gate tile.

20. The system of claim 16, wherein the position placement of each tile and the wire routes covers multiple layers of a multilayer circuit layout.

* * * * *